(12) United States Patent
Liston et al.

(10) Patent No.: US 11,470,398 B2
(45) Date of Patent: *Oct. 11, 2022

(54) SYSTEMS AND METHODS FOR ENABLING A USER TO START A SCHEDULED PROGRAM OVER BY RETRIEVING THE SAME PROGRAM FROM A NON-LINEAR SOURCE

(71) Applicant: Rovi Guides, Inc., San Jose, CA (US)

(72) Inventors: Alexander W. Liston, Menlo Park, CA (US); Kenichiro Tanaka, Menlo Park, CA (US); Margret B. Schmidt, Redwood City, CA (US); Elizabeth V. Riley, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/076,177

(22) Filed: Oct. 21, 2020

(65) Prior Publication Data

US 2021/0105537 A1  Apr. 8, 2021

Related U.S. Application Data

(63) Continuation of application No. 16/385,139, filed on Apr. 16, 2019, now Pat. No. 10,848,833, which is a
(Continued)

(51) Int. Cl.
*H04N 21/482* (2011.01)
*H04N 21/2387* (2011.01)
(Continued)

(52) U.S. Cl.
CPC ....... *H04N 21/4826* (2013.01); *H04N 21/232* (2013.01); *H04N 21/237* (2013.01);
(Continued)

(58) Field of Classification Search
None
See application file for complete search history.

(56) References Cited

U.S. PATENT DOCUMENTS

| | | |
|---|---|---|
| 5,801,787 A | 9/1998 | Schein et al. |
| 6,239,794 B1 | 5/2001 | Yuen et al. |

(Continued)

FOREIGN PATENT DOCUMENTS

| | | |
|---|---|---|
| EP | 2432225 A1 | 3/2012 |
| EP | 2947891 A1 | 11/2015 |

(Continued)

*Primary Examiner* — James R Marandi
(74) *Attorney, Agent, or Firm* — Haley Guiliano LLP

(57) ABSTRACT

Systems and methods are provided herein for receiving a request from a user to access a video that is scheduled for transmission, simultaneously to a plurality of users, beginning from a scheduled start time. The request is received after the scheduled start time the transmission is performed by a linear service to which the user subscribes. In response to receiving the request, the systems and methods may generate for display the video to the user, and may receive, during display of the video, a command from the user to start playback of the video over from the beginning. In response to receiving the command, the systems and methods may identify a non-linear service to which the user subscribes that offers a non-linear copy of the video, and may play back the non-linear copy of the video from the beginning.

20 Claims, 7 Drawing Sheets

US 11,470,398 B2
Page 2

Related U.S. Application Data continuation of application No. 15/431,437, filed on Feb. 13, 2017, now Pat. No. 10,390,098.

(60) Provisional application No. 62/441,897, filed on Jan. 3, 2017.

(51) Int. Cl.
*H04N 21/258* (2011.01)
*H04N 21/232* (2011.01)
*H04N 21/262* (2011.01)
*H04N 21/431* (2011.01)
*H04N 21/45* (2011.01)
*H04N 21/466* (2011.01)
*H04N 21/84* (2011.01)
*H04N 21/237* (2011.01)
*H04N 21/437* (2011.01)

(52) U.S. Cl.
CPC .......... *H04N 21/2387* (2013.01); *H04N 21/25866* (2013.01); *H04N 21/26241* (2013.01); *H04N 21/431* (2013.01); *H04N 21/4532* (2013.01); *H04N 21/4667* (2013.01); *H04N 21/4821* (2013.01); *H04N 21/4828* (2013.01); *H04N 21/84* (2013.01); *H04N 21/25891* (2013.01); *H04N 21/437* (2013.01)

(56) References Cited

U.S. PATENT DOCUMENTS

| | | |
|---|---|---|
| 6,388,714 B1 | 5/2002 | Schein et al. |
| 6,564,378 B1 | 5/2003 | Satterfield et al. |
| 6,756,997 B1 | 6/2004 | Ward et al. |
| 6,804,824 B1 | 10/2004 | Potrebic et al. |
| 7,165,098 B1 | 1/2007 | Boyer et al. |
| 7,735,107 B2 | 6/2010 | Ellis et al. |
| 7,761,892 B2 | 7/2010 | Ellis et al. |
| 8,046,801 B2 | 10/2011 | Ellis et al. |
| 8,066,801 B2 | 11/2011 | Nichols |
| 8,707,376 B1 | 4/2014 | Hannum et al. |
| 9,071,872 B2 | 6/2015 | Ellis |
| 9,369,741 B2 | 6/2016 | Ellis |
| 10,075,746 B2 | 9/2018 | Ellis et al. |
| 10,390,098 B2 | 8/2019 | Liston et al. |
| 10,848,833 B2 | 11/2020 | Liston et al. |
| 10,965,773 B2 * | 3/2021 | Spagnola ............ H04L 67/2852 |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2009/0172551 A1 | 7/2009 | Kane et al. |
| 2009/0178083 A1 | 7/2009 | Carr et al. |
| 2010/0153885 A1 | 6/2010 | Yates |
| 2011/0179453 A1 | 7/2011 | Poniatowski |
| 2012/0092997 A1 | 4/2012 | Mihaly et al. |
| 2012/0102526 A1 * | 4/2012 | Lejeune ............ H04N 21/4722 725/40 |
| 2013/0061266 A1 | 3/2013 | Chai et al. |
| 2013/0204825 A1 | 8/2013 | Su |
| 2013/0247081 A1 | 9/2013 | Vinson et al. |
| 2013/0283317 A1 | 10/2013 | Guntupalli et al. |
| 2013/0332839 A1 | 12/2013 | Frazier et al. |
| 2014/0007146 A1 | 1/2014 | Peterson et al. |
| 2014/0053225 A1 | 2/2014 | Shoykher et al. |
| 2014/0223480 A1 | 8/2014 | Berry et al. |
| 2014/0365856 A1 | 12/2014 | Costa-Requena et al. |
| 2015/0074700 A1 | 3/2015 | Danovitz |
| 2015/0163554 A1 | 6/2015 | Nishiguchi et al. |
| 2015/0178788 A1 | 6/2015 | Weber et al. |
| 2015/0245105 A1 | 8/2015 | Wickenkamp |
| 2015/0370818 A1 | 12/2015 | Desjardins et al. |
| 2016/0066040 A1 | 3/2016 | Webster et al. |
| 2016/0142783 A1 | 5/2016 | Bagga et al. |
| 2018/0192089 A1 | 7/2018 | Liston et al. |
| 2019/0246180 A1 | 8/2019 | Liston et al. |

FOREIGN PATENT DOCUMENTS

| | | |
|---|---|---|
| EP | 3566457 B1 | 12/2020 |
| WO | 2016069306 A1 | 5/2016 |

* cited by examiner

600

602 — Receive a Request from a User to Access a Video that is Scheduled for Transmission, Simultaneously to a Plurality of Users, Beginning from a Scheduled Start Time, Wherein the Request is Received After the Scheduled Start Time, and Wherein the Transmission is Performed by a Linear Service to Which the User Subscribes

604 — In Response to Receiving the Request, Generating for Display, Based on the Transmission, the Video to the User

606 — Receive, During Display of the Video, a Command from the User to Start Playback of the Video Over from the Beginning

608 — Retrieve Information of a Profile of the User

610 — Determine from the Information a Plurality of Non-linear Services to Which the User Subscribes that Provide Non-linear Content Over an Internet Link

612 — Query a Database Corresponding to Each Non-linear Service of the Plurality of Non-linear Services to Determine Whether Each Non-linear Service Offers a Non-linear Copy of the Video

614 — Determine, in Response to the Querying, that a Non-linear Service of the Plurality of Non-linear Services Offers the Non-linear Copy of the Video

616 — In Response to Determining that the Non-linear Service Offers the Non-linear Copy, Play Back the Non-linear Copy of the Video from the Beginning.

FIG. 6

SYSTEMS AND METHODS FOR ENABLING A USER TO START A SCHEDULED PROGRAM OVER BY RETRIEVING THE SAME PROGRAM FROM A NON-LINEAR SOURCE

CROSS-REFERENCE TO RELATED APPLICATIONS

This patent application is a continuation of U.S. patent application Ser. No. 16/385,139, filed Apr. 16, 2019, which is a continuation of U.S. patent application Ser. No. 15/431,437, filed Feb. 13, 2017, now U.S. Pat. No. 10,390,098, which claims the benefit of U.S. Provisional Patent Application No. 62/441,897, filed Jan. 3, 2017, the disclosures of which are hereby incorporated by reference herein in their entireties.

BACKGROUND

In the related art, linear services (e.g., cable television program providers) that provide scheduled programming sometimes offer a user an ability to restart a program if the user tunes to that program after its start time. The related art generally offers this option by recording the program at a server when the start time of the program begins and transmitting the missed, recorded portion to the user upon request, or by transmitting to the user an on-demand copy of the program upon receipt of a restart request. The related art, however, is limited to the same linear service providing both the scheduled programming and the restart copy. Thus, if the linear service does not have a restart copy available, no restart option will be available to the user.

SUMMARY

Systems and methods are provided herein for enabling a user to start playback of a scheduled video over when a first service to which the user subscribes does not offer an option to the user to start playback of the video over from a beginning of the video. As an illustrative example, when a broadcast television provider does not offer an option to restart a television program, the media guidance application may determine whether other non-linear services, such as the video streaming services Netflix and Hulu, offer the program to their subscribers. In the event that these services offer the program to their subscribers, and the user subscribes to at least one of these services, the media guidance application may provide a restart option to the user.

To this end and others, in some aspects of the disclosure, the media guidance application may receive a request from a user to access a video that is scheduled for transmission, simultaneously to a plurality of users, beginning from a scheduled start time, where the request is received after the scheduled start time, and where the transmission is performed by a linear service to which the user subscribes. For example, the media guidance application may receive a selection of a program on a television schedule guide for a program whose broadcast has already begun.

In some embodiments, in response to receiving the request, the media guidance application may generate for display, based on the transmission, the video to the user. For example, the media guidance application may tune to the channel on which the program is broadcast, and may thereby generate for display the program for display to the user.

In some embodiments, the media guidance application may receive, during display of the video, a command from the user to start playback of the video over from the beginning. For example, the media guidance application may generate for display a selectable option to restart the program. The command may be received by way of the media guidance application detecting a selection of the selectable option.

In some embodiments, in response to receiving the command, the media guidance application may retrieve information of a profile of the user. For example, the media guidance application may access a user profile and retrieve therefrom information about which non-linear services the user subscribes to. The media guidance application may determine, from the information, a plurality of non-linear services to which the user subscribes, where the non-linear services provide non-linear content over an Internet link.

In some embodiments, the media guidance application queries a database corresponding to each non-linear service of the plurality of non-linear services to determine whether each non-linear service offers a non-linear copy of the video. For example, if the user subscribes to the video streaming services Netflix, Hulu, and Amazon, the media guidance application may query each of those video streaming services to determine which ones, if any, offer a copy of the program for streaming to the user. As another example, the media guidance application may ingest catalogs for each non-linear service, based on the ingestion, the media guidance application may add metadata to a data structure corresponding to each media asset identifier for which the non-linear service offers a corresponding media asset that indicates that the non-linear service offers that media asset. The media guidance application may query a database housing the data structure to determine whether the non-linear services offers a non-linear copy of the video (or other media asset).

The media guidance application may determine, in response to the querying, that a non-linear service of the plurality of non-linear services offers the non-linear copy of the video. In response to determining that the non-linear service offers the non-linear copy, the media guidance application may play back the non-linear copy of the video from the beginning.

In some embodiments, in order to play back the non-linear copy of the video from the beginning, the media guidance application may launch a platform corresponding to the non-linear service, where the platform corresponding to the non-linear service is different from a platform corresponding to the linear service that is used to generate for display the video using the linear service. For example, the media guidance application may launch an application or website from which media offered by the non-linear service is accessed. The media guidance application may play back the non-linear copy of the video using the platform corresponding to the non-linear service.

In some embodiments, the media guidance application may determine whether playback of the non-linear copy of the video has terminated. For example, the media guidance application may monitor for an end of playback of the non-linear copy of the video (e.g., the runtime of the non-linear copy of the video has completely elapsed), or may monitor for a command from the user to terminate playback of the non-linear copy of the video (e.g., a command that indicates playback should be stopped). In response to detecting the end of playback of the non-linear copy of the video, or detecting the command from the user to terminate playback of the non-linear copy of the video, the media guidance application may determine that playback of the non-linear copy of the video has terminated.

In some embodiments, in response to determining that playback of the non-linear copy of the video has terminated, the media guidance application may exit the platform corresponding to the non-linear service and may resume generating for display video using the platform corresponding to the linear service. For example, the media guidance application may exit an application dedicated to the non-linear service, and may revert to whatever application was used to generate for display the video received by the linear service.

In some embodiments, the media guidance application may automatically determine, while the video is being generated for display using the transmission of the linear service, and without receiving the command, that the non-linear service offers the non-linear copy of the video. For example, the media guidance application may monitor services to which the user subscribes each time the user tunes to a broadcast channel to determine if a copy of a program on that broadcast channel is offered by a non-linear service to which the user subscribes. The media guidance application may thus determine that there is a linear service that the user subscribes to that offers the program.

In some embodiments, in response to the automatic determining, the media guidance application may automatically pre-cache the non-linear copy of the video at a cache local to the user. For example, the media guidance application may automatically access the non-linear service and buffer the program at the user equipment so that no buffer or download time will be experienced by the user if the user wants to restart the program. In response to receiving the command, the media guidance application may access the pre-cached non-linear copy of the video.

In some embodiments, the media guidance application may determine, in response to the querying, that no non-linear service of the plurality of non-linear services to which the user subscribes offers the non-linear copy of the video. In response to determining that no non-linear service of the plurality of non-linear services to which the user subscribes offers the non-linear copy of the video, the media guidance application may query a second plurality of non-linear services to which the user does not subscribe to determine whether a second non-linear service of the second plurality of non-linear services offers a second non-linear copy of the program. For example, the media guidance application may go beyond the non-linear services to which the user subscribes to determine whether any known non-linear service offers a copy of the program. In response to determining that the second non-linear service offers the second non-linear copy of the program, the media guidance application may generate for display to the user a selectable option to subscribe to the second non-linear service.

In some embodiments, the media guidance application, further in response to determining that the second non-linear service offers the second non-linear copy of the program, may pre-cache the second non-linear copy of the program at a cache local to the user, and, in response to receiving a selection of the selectable option to subscribe to the second non-linear service, may access the pre-cached second non-linear copy of the program. Thus, in the event the user chooses to subscribe to the second non-linear service, the non-linear copy of the video will be available to the user for immediate consumption without any time needed for buffering or download.

In some embodiments, the media guidance application may generate for display, in response to the querying, a menu indicating each non-linear service to which the user subscribes that offers the copy of the non-linear program. The media guidance application may receive a user selection from the menu of an indication corresponding to the non-linear service, where the playing back the non-linear copy of the video from the beginning comprises playing back the non-linear copy of the video from the beginning in response to receiving the user selection. The menu may additionally indicate non-linear services to which the user does not subscribe that offer the copy of the non-linear program.

In some embodiments, the media guidance application may determine whether the non-linear service provider offers a premium version of the non-linear copy of the video. For example, the media guidance application may determine that the broadcast video was received in high definition, but the non-linear service provider offers, in addition to a high definition copy, a 4K copy of the video. In response to determining that the non-linear service provider offers the premium version, the media guidance application may generate for display, during playback of the non-linear copy of the video, a selectable option for accessing the premium version.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 depicts an illustrative flowchart of a process for enabling a user to restart a video provided by a linear service by playing back a copy of the video from a non-linear service to which the user subscribes, in accordance with some embodiments of the disclosure;

DETAILED DESCRIPTION

Figure 1:
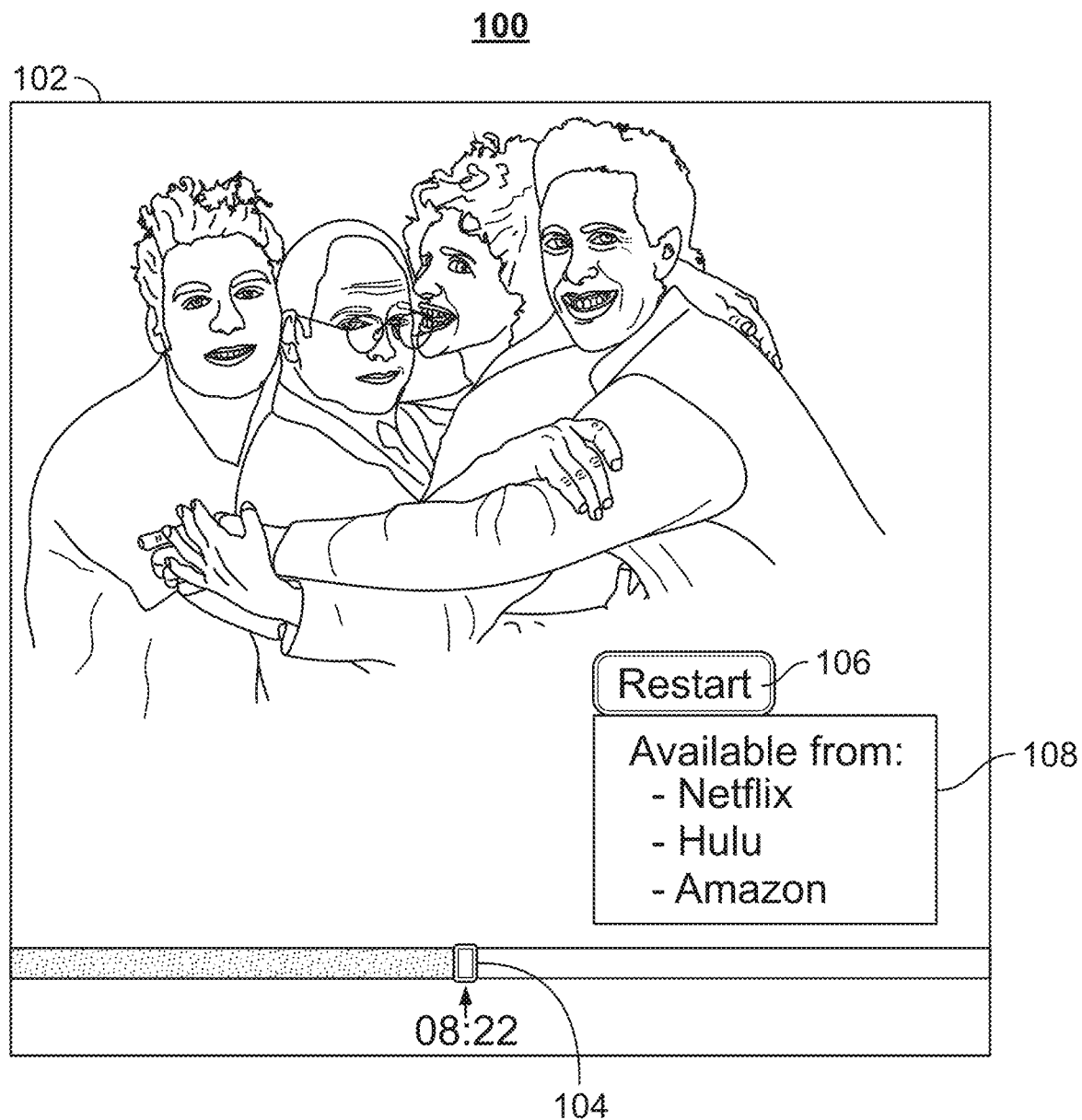
FIG. 1 depicts an illustrative embodiment of a display screen being used to play back a scheduled media asset, and including a selectable option to restart the scheduled media asset using a non-linear media asset, in accordance with some embodiments of the disclosure.

FIG. 1 depicts user equipment 100, which may be any user equipment, as described below with respect to FIGS. 2-5. A media guidance application (also described below with respect to FIGS. 2-5) generates for display media asset 102 on user equipment 100. As depicted, media asset 102 is an episode of the television sitcom series titled "Seinfeld." Media asset 102 is a linear media asset, and is transmitted to user equipment 100 and other user equipment simultaneously from a scheduled start time to a scheduled end time by a linear content source.

As used herein, the term "linear media asset" means a media asset that is scheduled for simultaneous transmission to a plurality of media assets. Examples of linear media assets are broadcast television programs, songs that are broadcast on the radio, videos or audio files that are simultaneously streamed from a linear content source to a plurality of user equipment, and the like. As used herein, the term "linear content provider" is a content provider that provides linear media assets. For example, service providers that provide access to television channels are linear content providers, as scheduled video is transmitted over those television channels. The term "content provider" is used interchangeably in this disclosure with "source," "content source," "service provider," and the like, and such interchanged use carries the same meaning as the defined meaning for the term "content provider."

Indicator 104 indicates an amount of time elapsed in media asset 102. For example, if transmission of media asset 102 began by the linear source at 5:00 pm, and it is now 5:08:22 pm, then indicator 104 may indicate that eight minutes and twenty-two seconds have elapsed, or may indicate a present time, or may indicate no time at all and instead use shading to show a proportion of the media asset. Indicator 104, like the other features of FIG. 1, is optional and need not be displayed.

Restart option 106 is a selectable option for restarting media asset 102. As will be described in further detail below, restart option 106 need not restart an exact copy of media asset 102; instead, a selection of restart option 106 may cause a non-linear copy of media asset 102 (i.e., a copy of media asset 102 that is not scheduled for transmission to a plurality of users at a pre-set time) to play back to the user. Menu 108 may optionally be displayed, and may indicate non-linear content providers from which a non-linear copy of media asset 102 may be obtained. The media guidance application may generate for display restart option 106 at any time during playback of media asset 102, including at a moment that the user requests playback of media asset 102.

In some embodiments, the media guidance application may receive a request from a user to access media asset 102 after a scheduled start time associated with media asset 102. For example, if the user subscribes to a cable television provider, that cable television provider acts as a linear content source of media asset 102. The media guidance application may receive the request from the user to access media asset 102 by way of the user accessing a channel on which media asset 102 is transmitted, by way of the user selecting a media asset identifier corresponding to media asset 102 from a program schedule guide, and the like. There are many ways for the media guidance application to receive a request from a user to access a linear media asset—for example, the linear media asset may be selected from a menu, listing, or the like (e.g., a media asset identifier may be selected on a website, which leads, upon selection, to a display of media asset 102). The request may be made in any known manner, including verbally, by tactile interaction with a user interface, or any other manner. Other manners in which a media guidance application receives requests from a user, and in which a user may request access to a media asset, are described in further detail below with respect to FIGS. 2-5, and that description applies equally here.

In some embodiments, in response to receiving the request, the media guidance application may generate for display, based on the transmission, the media asset to the user. Manners in which a media guidance application may output a media asset are described in further detail below with respect to FIGS. 2-5. Alternatively, if the media asset is an audio asset (e.g., a song or a radio show), the media asset may be generated for output by a speaker by the media guidance application. As depicted in FIG. 1, in response to receiving a request corresponding to media asset 102 at user equipment 100, the media guidance application would generate for display media asset 102 on user equipment 100.

In some embodiments, the media guidance application may receive, during display (or, e.g., audio output) of the media asset, a command from the user to start playback of the media asset over from the beginning. For example, the media guidance application may generate for display restart option 106. The command to start playback of the media asset over from the beginning may be received by the media guidance application by way of detecting a selection of restart option 106. Restart option 106 may be selected through any known manner of selection, such as voice input, manual selection by the user (e.g., tapping an icon corresponding to restart option 106), or any other manner of user input as described below with reference to FIGS. 2-5. Moreover, restart option 106 need not be displayed for a user to input the command to start playback of the media over from the beginning.

In some embodiments, in response to receiving the command, the media guidance application may retrieve information of a profile of the user. For example, the media guidance application may access a database (e.g., stored local to user equipment 100 or at a remote server, as described below with reference to FIGS. 2-5) and retrieve a user profile from the database. The media guidance application may determine, based on information of the retrieved user profile, which non-linear services the user subscribes to. The information may be populated based on user input that indicates which services the user subscribes to. Thus, the determination may be based on express user input. In other embodiments, the information may be automatically populated based on the media guidance application monitoring to which non-linear sources the user subscribes; the information may be updated when the media guidance application detects, from the monitoring, that the user has unsubscribed from a non-linear service. The media guidance application may determine, from the information, a plurality of non-linear services to which the user subscribes, where the non-linear services provide non-linear content over an Internet link.

In some embodiments, the media guidance application queries each non-linear service of the plurality of non-linear services to determine whether each non-linear service offers a non-linear copy of the video. For example, the media guidance application may have determined, based on the user profile, that the user subscribes to the non-linear video streaming services Netflix, Hulu, and Amazon. Thus, the media guidance application may query each of those video streaming services to determine which ones of Netflix, Hulu, and Amazon, if any, offer a copy of the program for streaming to the user. Alternatively, the media guidance application may query a database (e.g., media guidance data source) that indicates, for each program, which non-linear services offer a copy of the program for streaming to the user. The database may be populated by ingesting catalogs for all known non-linear services and mapping an indicator to a data structure corresponding to a given media asset that indicates which non-linear services offer the given media asset.

The media guidance application may determine, in response to the querying, that one or more of the non-linear services to which the user subscribes does in fact offer a copy of the program for streaming to the user. For example, the media guidance application may determine that Netflix offers a non-linear copy of media asset 102. In response to determining that the non-linear service offers the non-linear copy, the media guidance application may play back the non-linear copy of the video from the beginning. In some embodiments, the playback may be automatic and require no further input from the user other than a selection of restart option 106. For example, if only one recording at user equipment 100 exists and no other services offer the media asset, the media guidance application may automatically select that recording for playback. As another example, the media guidance application may select one of a plurality of non-linear sources for use for playback of a copy of media asset 102 if more than one offers a copy of media asset 102. This selection may be at random or may be based on known user preferences as indicated in the profile of the user.

In some embodiments, rather than generating for display restart option 106 in response to the user requesting to view media asset 102, the media guidance application may determine, using the methods described above, whether a non-linear service that the user subscribes to offers a non-linear copy of media asset 102. The media guidance application may refrain from generating for display restart option 106 unless a non-linear service to which the user subscribes does in fact offer the non-linear copy of media asset 102, in which case the media guidance application may responsively generate for display restart option 106. In this case, in response to receiving a user selection of restart option 106, the media guidance application may generate for display the non-linear copy of media asset 102.

In some embodiments, in order to play back the non-linear copy of the video from the beginning, the media guidance application may launch a platform corresponding to the non-linear service, where the platform corresponding to the non-linear service is different from a platform corresponding to the linear service that is used to generate for display the video using the linear service. As used herein, the term "platform" is defined to mean software required to access or play back the non-linear copy of media asset 102. For example, many non-linear service providers can be accessed through a web page, or through a proprietary application. The term "platform" encompasses such a web page, proprietary application, and any other software medium or service required to access the non-linear copy of the media asset. Thus, if the non-linear service that provides a non-linear copy of media asset 102 is Netflix, the media guidance application may cause user equipment 100 to automatically launch a proprietary application offered by Netflix. The media guidance application may play back the non-linear copy of the video using the platform corresponding to the non-linear service. The media guidance application may launch the proprietary application in a manner such that transitioning to the proprietary application is not noticeable by the user.

In some embodiments, the media guidance application may determine whether playback of the non-linear copy of media asset 102 has terminated. For example, the media guidance application may monitor for an end of playback of the non-linear copy of media asset 102 (e.g., the runtime of the non-linear copy of media asset 102 has completely elapsed). As another example, the media guidance application may monitor for a command from the user to terminate playback of the non-linear copy of media asset 102 (e.g., a pause or stop command). In response to detecting the end of playback of the non-linear copy of the video, or in response to detecting the command from the user to terminate playback of the non-linear copy of the video, the media guidance application may determine that playback of the non-linear copy of the video has terminated.

In some embodiments, in response to determining that playback of the non-linear copy of media asset 102 has terminated, the media guidance application may exit the platform corresponding to the non-linear service and may resume generating for display video using the platform corresponding to the linear service. The exiting of the platform corresponding to the non-linear service may be a seamless transition that is invisible to the user. Thus, the media guidance application may generate for display (and/or output audio relating to) a presently transmitted linear media asset from the linear content source that was transmitting media asset 102.

In some embodiments, the media guidance application may automatically determine, while media asset 102 is being generated for display (or otherwise output) using the transmission of the linear service, and without receiving the command, that the non-linear service offers the non-linear copy of the video. In other words, as described above, the media guidance application may automatically determine whether a non-linear copy of media asset 102 is available. This may be performed responsive to the user tuning to the linear source, or may be performed in advance (e.g., when schedule of media assets becomes known to the media guidance application).

In some embodiments, in response to the automatic determining, the media guidance application may automatically pre-cache the non-linear copy of the video at a cache local to the user. For example, the media guidance application may automatically access the non-linear service and buffer media asset 102 at user equipment 100 so that no buffer or download time will be experienced by the user if the user wants to restart the program. Thus, in response to receiving a selection of restart option 106, the media guidance application may access the pre-cached non-linear copy of media asset 102 and avoid any time loss in transitioning to playback of the non-linear copy of media asset 102.

In some embodiments, the media guidance application may determine, in response to the querying, that no non-linear service of the plurality of non-linear services to which the user subscribes offers the non-linear copy of media asset 102. Thus, if the user subscribes to Netflix, Amazon, and Hulu, the media guidance application would reach this determination if none of these three non-linear service providers offer a non-linear copy of media asset 102. In response to determining that no non-linear service of the plurality of non-linear services to which the user subscribes offers the non-linear copy of media asset 102, the media guidance application may query a second plurality of non-linear services to which the user does not subscribe to determine whether any of those providers offer a non-linear copy of media asset 102.

In response to determining that a non-linear service to which the user does not subscribe offers the second non-linear copy of the program, the media guidance application may generate for display to the user a selectable option to subscribe to the second non-linear service. In some embodiments, the media guidance application may offer an ability to access a non-linear copy of media asset 102 a-la-carte from the second non-linear service. In some embodiments, the media guidance application may require a broader subscription to the second non-linear service from the user before the user is enabled to access the non-linear copy of media asset 102 from the second service.

In some embodiments, the media guidance application, further in response to determining that the second non-linear service offers the second non-linear copy of the program, may pre-cache the second non-linear copy of the program at a cache local to the user. Pre-caching operations were described in detail above, and apply equally here. In response to receiving a selection of the selectable option to subscribe to the second non-linear service (or in response to receiving a selection of a selectable option to access the second non-linear copy of media asset 102 a-la-carte), the media guidance application may access the pre-cached second non-linear copy of media asset 102 in order to generate for display to the user the second non-linear copy of media asset 102.

In some embodiments, the media guidance application may generate for display, in response to the querying, a menu (e.g., menu 108) indicating each non-linear service to which the user subscribes that offers the copy of media asset 102. Menu 108 may include, for example, local non-linear content sources as well, such as local or network recordings or otherwise stored copies of media asset 102. The media guidance application may generate for display menu 108 upon a request by the user to access menu 108. Alternatively, the media guidance application may generate for display menu 108 in response to receiving a user selection of request option 106. The media guidance application may receive a user selection from menu 108 of an indication corresponding to the non-linear service, where the playing back the non-linear copy of the video from the beginning comprises playing back the non-linear copy of the video from the beginning in response to receiving the user selection. The menu may additionally indicate non-linear services to which the user does not subscribe that offer the copy of the non-linear program. If a user selects a non-linear service to which the user does not subscribe, the media guidance application may responsively subscribe the user to the non-linear service, and access the non-linear copy of media asset 102 from that non-linear service for playback from the beginning. Non-linear services that do not offer a subscription, and/or instead sell access to media asset 102 a-la-carte may be included in menu 108.

In some embodiments, the media guidance application may determine whether the non-linear service provider offers a premium version of the non-linear copy of the video. For example, the media guidance application may determine that media asset 102 was received in high definition from the linear source, but the non-linear service provider offers, in addition to a high definition copy, a better quality 4K copy of media asset 102. As another example, the non-linear service may offer enhanced features in a premium version of media asset 102, such as director or editorial commentary, additional subtitles not available by way of the linear service, and the like. In some embodiments, in response to determining that the non-linear service provider offers the premium version, the media guidance application may generate for display, during playback of the non-linear copy of media asset 102, a selectable option for accessing the premium version. In response to receiving a selection of the selectable option, the media guidance application may access the premium version of media asset 102 and generate for display the premium version. In some embodiments, the media guidance application may automatically, and without selection of restart option 106, play back a premium version of media asset 102 instead of the version provided by the linear service. This may be triggered upon detection of a premium version existing, or may be triggered upon a user command to access a premium version. Facets of the premium version (e.g., commentary, subtitles, etc) may also be retrieved and overlayed on top of the version provided by media asset 102 in order to enhance media asset 102 as provided by the linear service.

In some embodiments, when the media guidance application generates for display a media asset identifier (e.g., in connection with presenting a guide or listing of available media), the media guidance application determines all linear and non-linear providers that offer media corresponding to the media asset identifier. The media guidance application may display identifiers of all linear and non-linear providers that offer the media, or may display identifiers of only those providers that offer the media to which the user subscribes. In some embodiments, the media guidance application may display only identifiers of those providers who have the content available to watch immediately (e.g., as opposed to on a schedule for release or transmission at a later time).

In some embodiments, the media guidance application may generate for display a visual indicator over a media asset identifier, or over a grid guide, that indicates an amount of each media asset that has already elapsed, and/or that indicates how much of a media asset is still left to view.

In some embodiments, the media guidance application generates for display media asset identifiers that identify media from a linear content source that was transmitted in the past. In response to receiving a user selection of media that was transmitted in the past, the media guidance application may generate for display further information about that media, including an ability to access that media (e.g., from a linear or non-linear content provider to which the user subscribes), or to access related media (e.g., other episodes from a same series that the media corresponds to).

In some embodiments, the media guidance application profiles the user and tracks the users activity. Thus, the media guidance application may monitor and store information relating to a user's most watched channel. The profiled data may include both data relating to programs users have recorded, as well as those the user actively watched while the program was live. The profile may weight viewings differently (e.g., a recorded program may be weighted less than a weighting for a program viewed live), and the media guidance application may determine that a channel is most watched if that channel has a highest weighted score. Moreover, a user may have several most watched channels, and may designated one or more of those most watched channels as a favorite channel. The media guidance application may cause user equipment to automatically tune to the favorite channel when powered on. In some embodiments, channels may be watched less frequently over time, and thus may age out of the most watched channels of the user. Moreover, some most watched channels may only seasonally be "most watched"—that is, they may only be a most-watched channel when a favorite program is airing.

In some embodiments, the media guidance application may predict that a user would enjoy a different program from the program that the user is presently watching (e.g., based on profile information of the user). The media guidance application may generate for display a recommendation of that predicted program to the user. In response to receiving a user selection of the recommendation, the media guidance application may generate for display the predicted program. The prediction may change as the user's profile changes. The recommendation may be generated for display in a manner that does not obscure the program currently being played back, and may be generated for display automatically or in response to a user request for a prediction.

In some embodiments, a small guide including one line or only a small number of lines may be generated for display on top of media asset 102. The media guidance application may enable the user to use the small guide to browse all linear past, present, and future content without leaving a full-screen presentation of media asset 102. In some embodiments, the media guidance application may receive a request from the user to display what media is currently being cached on other tuners different from, e.g., a tuner being used to tune to media asset 102. The media guidance application responsively generates for display identifiers of the content, or thumbnail versions of the content itself, for the user to preview or otherwise browse without leaving the full-screen presentation of media asset 102.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
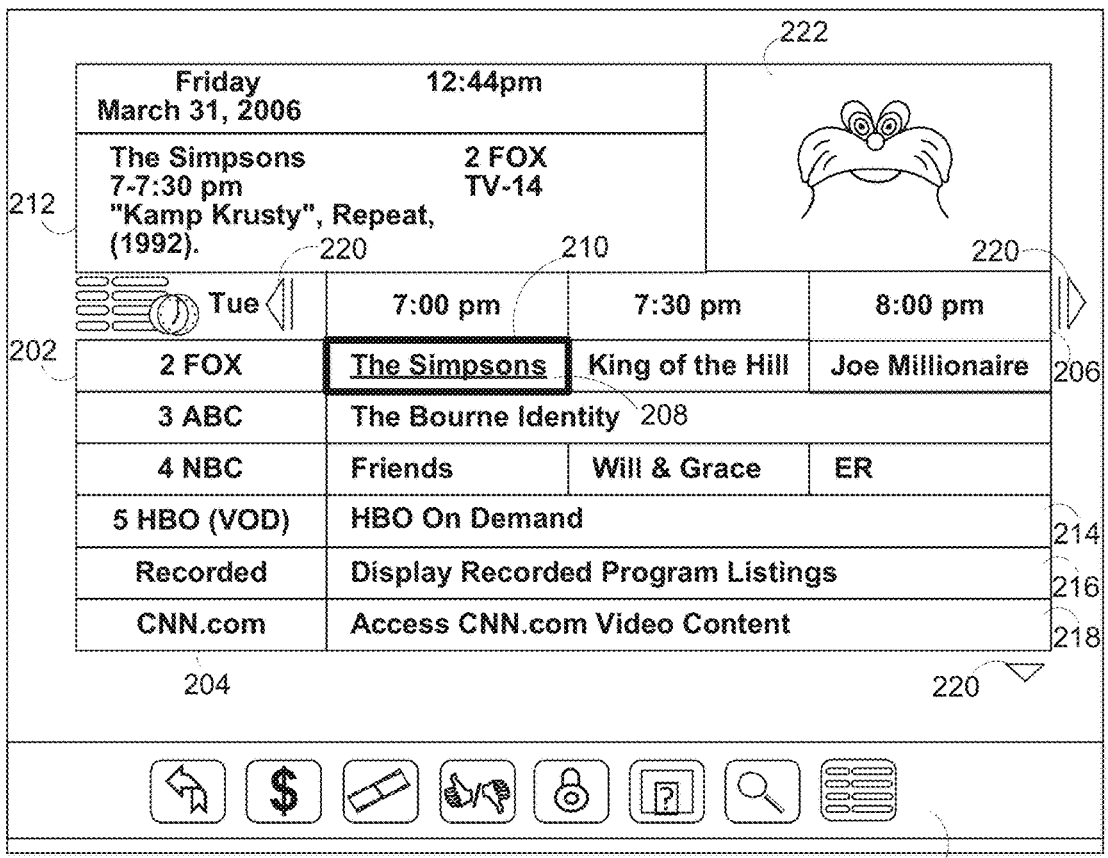
FIG. 2 shows an illustrative embodiment of a display screen that may be used to provide media guidance application listings and other media guidance information, in accordance with some embodiments of the disclosure.
Figure 3:
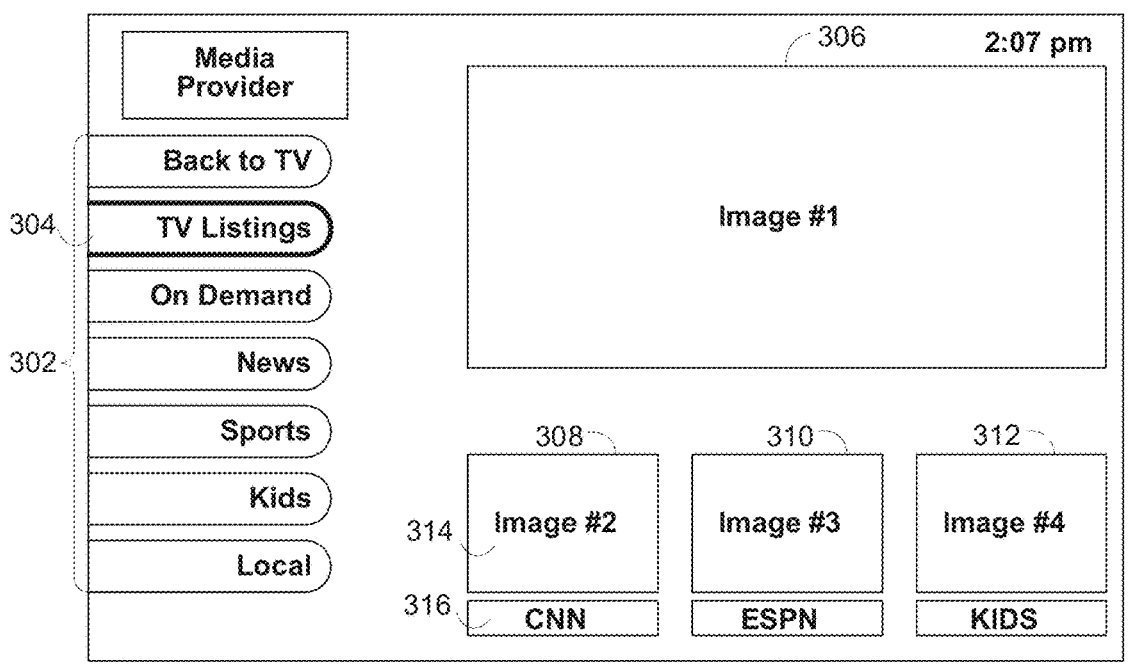
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
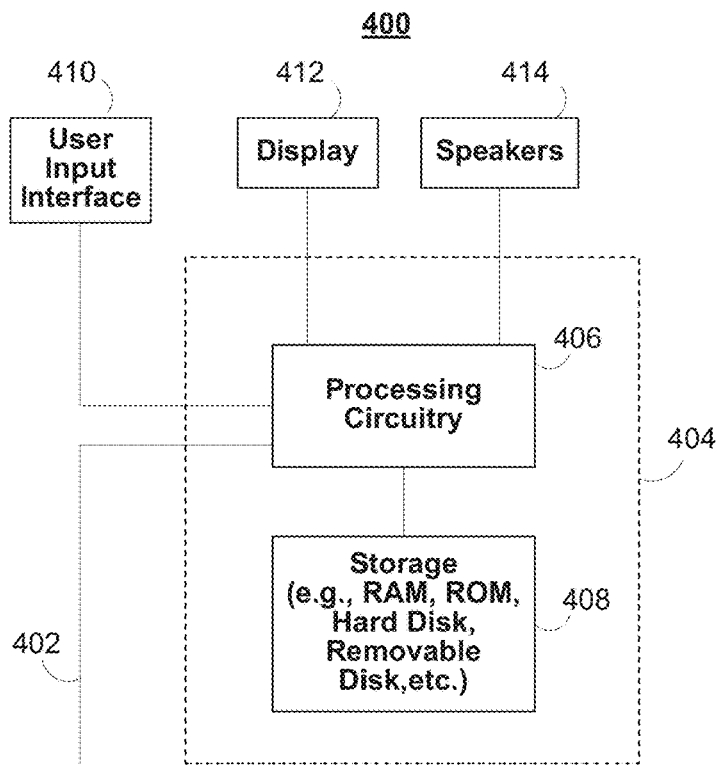
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
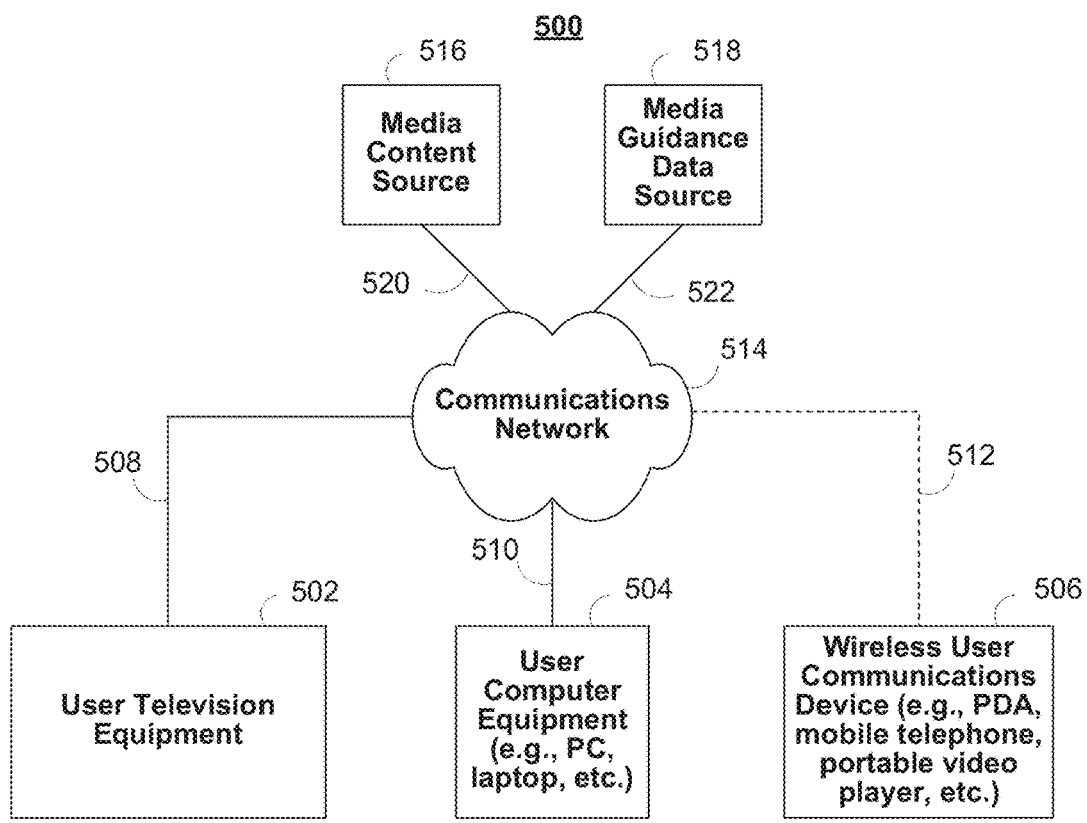
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 6 depicts an illustrative flowchart of a process for enabling a user to restart a video provided by a linear service by playing back a copy of the video from a non-linear service to which the user subscribes, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communications network 514.

Process 600 begins at 602, where control circuitry 404 receives a request from a user to access a video (or any media asset 102) that is scheduled for transmission, simultaneously to a plurality of users, beginning from a scheduled start time, where the request is received after the scheduled start time, and where the transmission is performed by a linear service to which the user subscribes. The request may be received by way of user input interface 410. The linear service may be media content source 516, and may transmit the video over communications network 514.

At 604, control circuitry 404, in response to receiving the request, generates for display (e.g., on display 412), based on the transmission, the video to the user. At 606, control circuitry 404 receives, during display of the video, a command from the user to start playback of the video over from the beginning. The command may be received by way of user input interface 410. At 608, control circuitry 404 retrieves information of a profile of the user. The information may be retrieved from media guidance data source 518 and/or storage 508.

At 610, control circuitry 404 determines from the information a plurality of non-linear services to which the user subscribes that provide non-linear content over an Internet link. The non-linear services may each correspond to a database with the functionality of media content source 516 that houses copies of media assets. At 612, control circuitry 404 queries each non-linear service of the plurality of non-linear services (or queries a database comprising data structures that indicate, for each media asset, which non-linear services provide a copy of the media asset, as described above) to determine whether each non-linear service offers a non-linear copy of the video. For example, control circuitry 404 queries databases with the functionality of media guidance data source 518 that each correspond to the non-linear services.

At 614, control circuitry 404 determines, in response to the querying, that a non-linear service of the plurality of non-linear services offers the non-linear copy of the video (e.g., media asset 102). At 616, in response to determining that the non-linear service offers the non-linear copy, control circuitry 404 plays back the non-linear copy of the video from the beginning.

Figure 7:
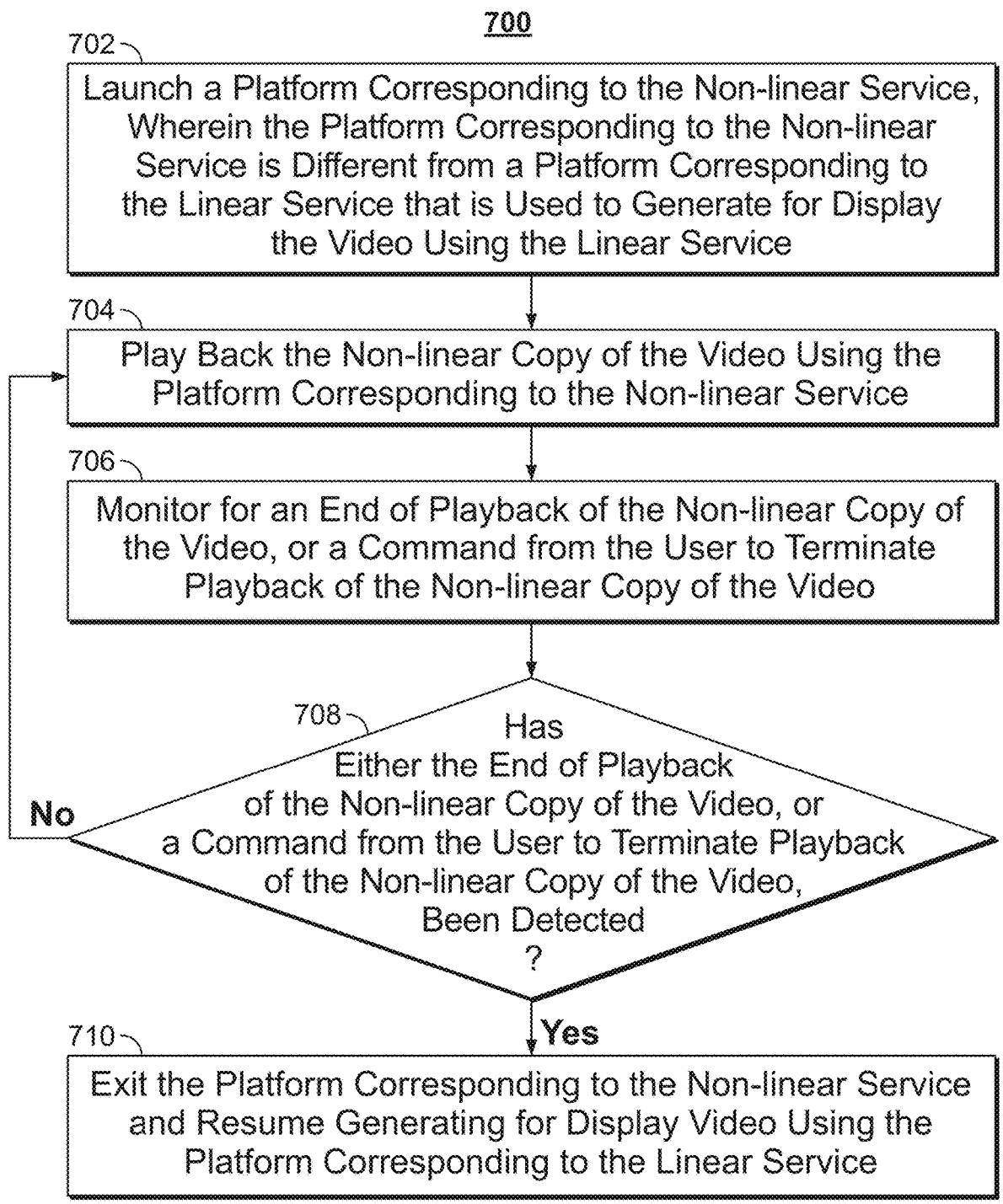
FIG. 7 depicts an illustrative flowchart of a process for launching a platform to play back a non-linear copy of the program, and exiting the program when playback of the non-linear copy of the video is terminated, in accordance with some embodiments of the disclosure.

FIG. 7 depicts an illustrative flowchart of a process for launching a platform to play back a non-linear copy of the program, and exiting the program when playback of the non-linear copy of the video is terminated, in accordance with some embodiments of the disclosure. Process 700 begins at 702, where the media guidance application launches a platform corresponding to the non-linear service, wherein the platform corresponding to the non-linear service is different from a platform corresponding to the linear service that is used to generate for display the video using the linear service.

At 704, control circuitry 404 plays back the non-linear copy of the video using the platform corresponding to the non-linear service (e.g., and displays the copy on display 412). At 706, control circuitry monitors for an end of playback of the non-linear copy of the video, or for a command from the user to terminate playback of the non-linear copy of the video. The command from the user may be input by way of user input interface 410.

At 708, control circuitry 404 determines whether either the end of playback of the non-linear copy of the video, or a command from the user to terminate playback of the non-linear copy of the video, has been detected. If neither is detected, process 700 reverts to 704. If either is detected, process 700 continues to 710, where control circuitry 404 causes the platform corresponding to the non-linear service to be exited. Control circuitry 404 resumes generating for display video using the platform corresponding to the linear service (e.g., from media content source 516).

Figure 8:
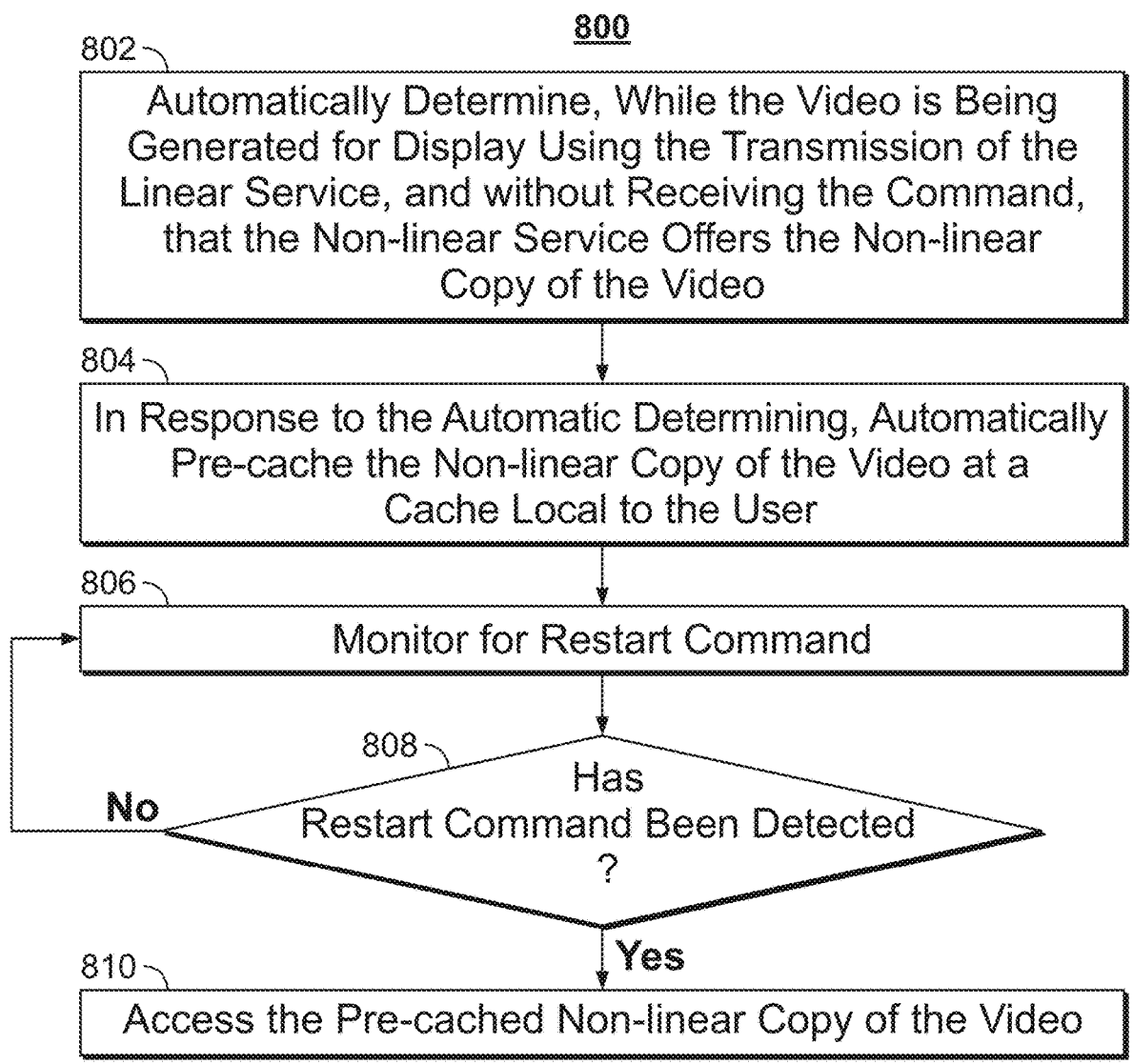
FIG. 8 depicts an illustrative flowchart of a process for accessing a pre-cached copy of the video when a restart command is received, in accordance with some embodiments of the disclosure.

FIG. 8 depicts an illustrative flowchart of a process for accessing a pre-cached copy of the video when a restart command is received, in accordance with some embodiments of the disclosure. Process 800 begins at 802, where control circuitry 404 automatically determines, while the video is being generated for display using the transmission of the linear service, and without receiving the command, that the non-linear service offers the non-linear copy of the video (e.g., by querying a database corresponding to media guidance data source 518 that is associated with the non-linear service).

At 804, in response to the automatic determining, control circuitry 404 automatically pre-caches the non-linear copy of the video at a cache local to the user (e.g., at memory 408). At 806, control circuitry 404 monitors for a receipt of a restart command (e.g., a user selection of restart option 106 by way of user input interface 410). At 808, control circuitry 404 determines whether the restart command has been detected; if it has not, process 800 reverts to 806 and control circuitry 404 continues to monitor, otherwise process 800 continues to 810. At 810, control circuitry 404 accesses the pre-cached non-linear copy of the video.

Figure 9:
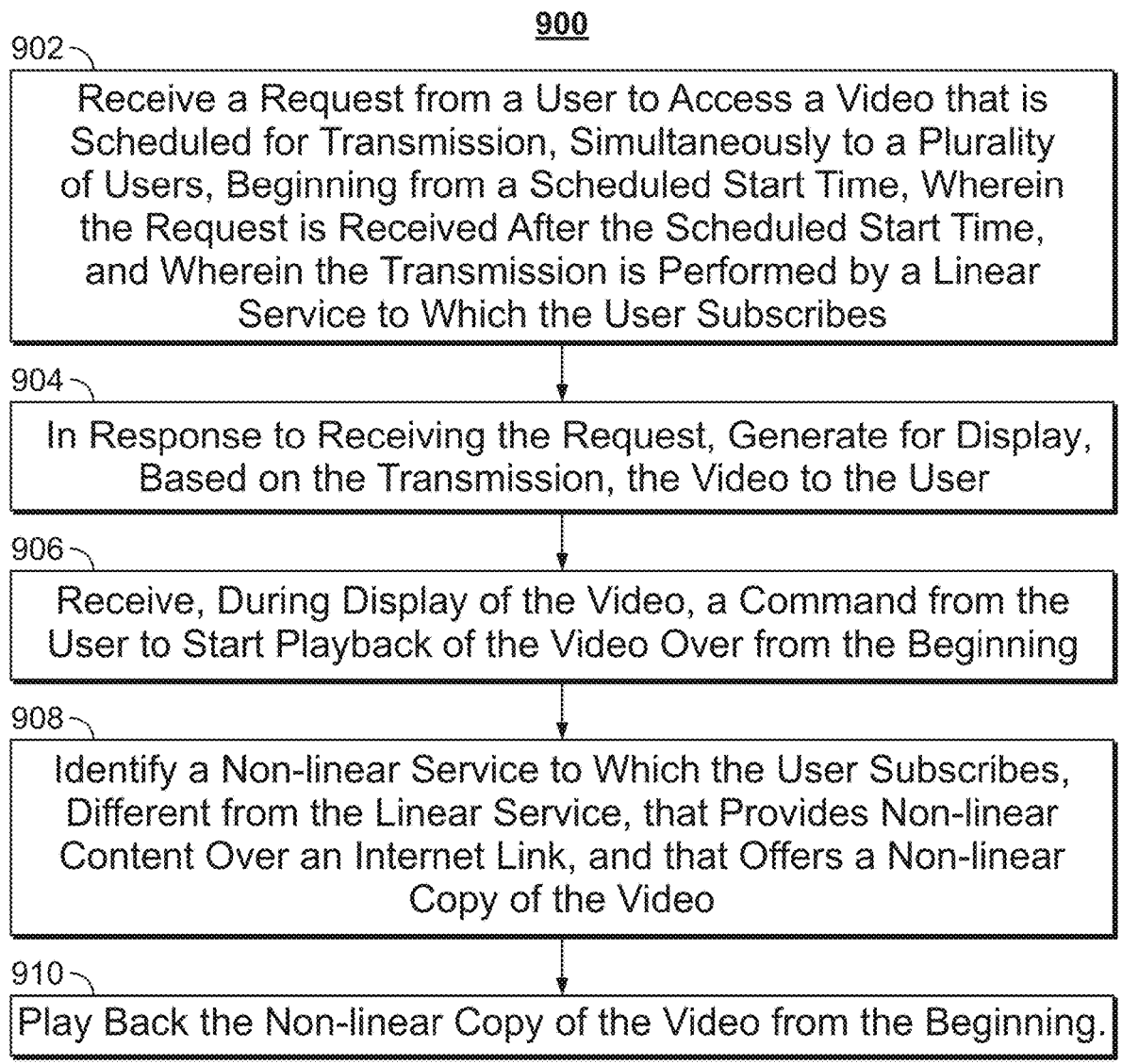
FIG. 9 depicts an illustrative flowchart of a process for restarting a video transmitted by a linear source when the linear source does not offer a restart mechanism, in accordance with some embodiments of the disclosure.

FIG. 9 depicts an illustrative flowchart of a process for restarting a video transmitted by a linear source when the linear source does not offer a restart mechanism, in accordance with some embodiments of the disclosure. Process 900 begins at 902, where control circuitry 404 receives a request from a user to access a video (e.g., media asset 102)

that is scheduled for transmission (e.g., from media content source 516 by way of communications network 414), simultaneously to a plurality of users, beginning from a scheduled start time, where the request is received after the scheduled start time, and where the transmission is performed by a linear service (e.g., media content source 516) to which the user subscribes.

At 904, in response to receiving the request, control circuitry 404 generates for display (e.g., by way of display 412), based on the transmission, the video to the user. At 906, control circuitry 404 receives, during display of the video, a command from the user to start playback of the video over from the beginning (e.g., by way of user input interface 410 being used to select restart command 106). At 908, control circuitry 404 identifies a non-linear service to which the user subscribes, different from the linear service, that provides non-linear content over an Internet link, and that offers a non-linear copy of the video. At 910, control circuitry 404 plays back the non-linear copy of the video from the beginning.

It should be noted that processes 600-900 or any step thereof could be performed on, or provided by, any of the devices shown in FIGS. 1 and 4-5. For example, any of processes 600-900 may be executed by control circuitry 404 (FIG. 4) as instructed by control circuitry implemented on a user equipment 502, 504, 506 (FIG. 5), and/or a user equipment for selecting a recommendation. In addition, one or more steps of processes 600-900 may be incorporated into or combined with one or more steps of any other process or embodiment.

It is contemplated that the steps or descriptions of each of FIGS. 6-9 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-9.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining where restart option 106 is selected may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of the profile, such as subscription settings, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention" or "related art," any such reference is merely for the purpose of providing context to the invention(s) of the instant disclosure, and does not form any admission as to what constitutes the state of the art.

What is claimed is:

1. A method comprising:
   accessing, by a device, a video from a linear service at a first position corresponding to a first time after a scheduled start time of the video at the linear service;
   determining, based on a user profile, a non-linear service that provides the video for streaming over a network link;
   without receiving a user command to access the non-linear service, locally caching, at the device, a portion of the video from the non-linear service;
   receiving a user command to play back the video from a second position corresponding to a time prior to the first time;
   in response to receiving the user command to play back the video from the second position, generating the portion of the video that is locally cached at the device for display from the second position.

2. The method of claim 1, wherein locally caching the portion of the video comprises automatically pre-caching a non-linear version of the video at a cache of the device.

3. The method of claim 1, wherein the user command to play back the video from the second position comprises a user command to restart the video from a beginning.

4. The method of claim 1, wherein accessing the video from the linear service at the first position comprises generating the video for display using a transmission of the linear service.

5. The method of claim 1, further comprising:
   receiving a user selection to subscribe the non-linear service;
   wherein locally caching the portion of the video from the non-linear service is in response to receiving the user selection to subscribe the non-linear service.

6. The method of claim 1, further comprises determining, based on the user profile, that a user subscribes to the non-linear service.

7. The method of claim 1, wherein determining the non-linear service that provides the video for streaming comprises querying a database associated with the non-linear service.

8. The method of claim 7, further comprising:
   determining, in response to querying the database associated with the non-linear service, that the non-linear service does not offer another video for streaming;

querying a database associated with another non-linear service that is different from the non-linear service; and
determining that another non-linear service provides another video for streaming over the network link.

9. The method of claim 8, further comprising:
determining, based on the user profile, that a user does not subscribe to another non-linear service; and
generating for display a selectable option to subscribe to another non-linear service.

10. The method of claim 1, further comprising:
generating for display, a menu indicating for each non-linear service that offers the video for streaming.

11. A system comprising:
control circuitry configured to:
   access, a video from a linear service at a first position corresponding to a first time after a scheduled start time of the video at the linear service;
   determine, based on a user profile, a non-linear service that provides the video for streaming over a network link; and
   without receiving a user command to access the non-linear service, locally cache a portion of the video from the non-linear service;
user interface control circuitry configured to:
   receive a user command to play back the video from a second position corresponding to a time prior to the first time; and
wherein the control circuitry is further configured to:
   in response to receiving the user command to play back the video from the second position, generate the portion of the video that is locally cached for display from the second position.

12. The system of claim 11, wherein the control circuitry, when locally caching the portion of the video, is configured to automatically pre-cache a non-linear version of the video.

13. The system of claim 11, wherein the user command to play back the video from the second position comprises a user command to restart the video from a beginning of the video.

14. The system of claim 11, wherein the control circuitry, when accessing the video from the linear service at the first position, is configured to generate the video for display using a transmission of the linear service.

15. The system of claim 11, wherein the control circuitry is further configured to:
receive a user selection to subscribe the non-linear service;
wherein locally caching the portion of the video from the non-linear service is in response to receiving the user selection to subscribe the non-linear service.

16. The system of claim 11, wherein the control circuitry is further configured to determine, based on the user profile, that a user subscribes to the non-linear service.

17. The system of claim 11, wherein the control circuitry, when determining the non-linear service that provides the video for streaming, is configured to query a database associated with the non-linear service.

18. The system of claim 17, wherein the control circuitry is further configured to:
determine, in response to querying the database associated with the non-linear service, that the non-linear service does not offer another video for streaming;
query a database associated with another non-linear service that is different from the non-linear service; and
determine that another non-linear service provides another video for streaming over the network link.

19. The system of claim 18, wherein the control circuitry is further configured to:
determine, based on the user profile, that a user does not subscribe to another non-linear service; and
generate for display a selectable option to subscribe to another non-linear service.

20. The system of claim 11, wherein the user interface circuitry is further configured to generate for display, a menu indicating for each non-linear service that offers the video for streaming.

* * * * *